US010999195B1

(12) United States Patent
Suryanarayana et al.

(10) Patent No.: US 10,999,195 B1
(45) Date of Patent: May 4, 2021

(54) MULTICAST VPN SUPPORT IN DATA CENTERS USING EDGE REPLICATION TREE

(71) Applicant: Juniper Networks, Inc., Sunnyvale, CA (US)

(72) Inventors: Anantharamu Suryanarayana, San Jose, CA (US); Nikhil Kumar Bansal, Bangalore (IN); Nischal Kumar N. Sheth, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 108 days.

(21) Appl. No.: 16/357,890

(22) Filed: Mar. 19, 2019

(51) Int. Cl.
*G06F 15/16* (2006.01)
*H04L 12/715* (2013.01)
*H04L 12/753* (2013.01)
*H04L 12/751* (2013.01)
*H04L 12/46* (2006.01)
*H04L 12/723* (2013.01)
*H04L 12/761* (2013.01)

(52) U.S. Cl.
CPC .......... *H04L 45/64* (2013.01); *H04L 12/4645* (2013.01); *H04L 45/02* (2013.01); *H04L 45/16* (2013.01); *H04L 45/48* (2013.01); *H04L 45/507* (2013.01)

(58) Field of Classification Search
CPC ..... H04L 45/64; H04L 12/4645; H04L 45/02; H04L 45/16; H04L 45/48; H04L 45/507; H04L 45/586; H04L 49/354
USPC ........................................................ 709/232
See application file for complete search history.

(56) References Cited

U.S. PATENT DOCUMENTS 8,683,023 B1 * 3/2014 Brandwine ........... H04L 45/586
709/222
2007/0147372 A1 * 6/2007 Liu ......................... H04L 45/00
370/390

(Continued)

OTHER PUBLICATIONS

"Juniper / contrail-specs / bgp_mvpn.md" GitHub, Apr. 19, 2018, available at https://github.com/Juniper/contrail-specs/blob/master/bgp_mvpn.md, last accessed Mar. 6, 2019, 9 pp.

(Continued)

*Primary Examiner* — Atta Khan
(74) *Attorney, Agent, or Firm* — Shumaker & Sieffert, P.A.

(57) ABSTRACT

Techniques are disclosed for seamless integration between a multicasting Virtual Private Network and an edge replicated multicast network. For example, a controller (e.g., software defined networking (SDN) controller) may facilitate the integration between a multicasting VPN network and an edge replicated multicast network through the selection of a multicast bridge node from virtual routers specified in the multicast replication tree, and sending information identifying the multicast bridge node to a provider edge (PE) device for the source VPN such that the PE device may use the information to steer multicast traffic from the source VPN site across the Layer 3 VPN network to the multicast bridge node of the receiver VPN site. When the multicast bridge node receives the multicast traffic, the multicast bridge node determines from the information that it is to receive the multicast traffic and to perform the edge replicated multicast using the edge replicated multicast tree.

20 Claims, 6 Drawing Sheets

(56) References Cited

U.S. PATENT DOCUMENTS

| | | | | |
|---|---|---|---|---|
| 2014/0003245 | A1* | 1/2014 | Han | H04L 47/806 370/236 |
| 2014/0098813 | A1* | 4/2014 | Mishra | H04L 12/185 370/390 |
| 2014/0269328 | A1* | 9/2014 | Venkataswami | H04L 12/18 370/238 |
| 2015/0078152 | A1* | 3/2015 | Garg | H04L 41/0668 370/219 |
| 2015/0281054 | A1* | 10/2015 | Utgikar | H04L 49/351 709/221 |
| 2016/0134527 | A1* | 5/2016 | Kwak | H04L 45/586 370/352 |
| 2016/0191329 | A1* | 6/2016 | Venkataswami | H04L 41/12 709/224 |
| 2017/0181210 | A1* | 6/2017 | Nadella | H04W 48/16 |
| 2018/0097734 | A1* | 4/2018 | Boutros | H04L 12/4633 |
| 2018/0167315 | A1* | 6/2018 | Kanjariya | H04L 12/185 |
| 2019/0068544 | A1* | 2/2019 | Hao | H04L 45/26 |

OTHER PUBLICATIONS

Marques et al., "Edge multicast replication for BGP IP VPNs" draft-marques-l3vpn-mcast-edge-01, Network Working Group, Internet-Draft, Jun. 2012, 16 pp.

Rosen et al., "Multicast in MPLS/BGP IP VPNs" Internet Engineering Task Force (IETF), RFC 6513, Feb. 2012, 88 pp.

Rosen, "BGP/MPLS IP Virtual Private Networks (VPNs)," Network Working Group, RFC 4364, Feb. 2006, 48 pp.

Deering, "Host Extensions for IP Multicasting" Network Working Group, RFC 1112, Aug. 1989, 17 pp.

Fenner, W., "Internet Group Management Protocol, Version 2" Network Working Group, RFC 2236, Nov. 1997, 24 pp.

Cain et al., "Internet Group Management Protocol, Version 3" Network Working Group, RFC 3376, Oct. 2002, 53 pp.

Holbrook et al., "Using Internet Group Management Protocol Version 3 (IGMPv3) and Multicast Listener Discovery Protocol Version 2 (MLDv2) for Source-Specific Multicast," Network Working Group; RFC 4604, Aug. 2006, 11 pp.

Sajassi et al., "IGMP and MLD Proxy for EVPN, draft-sajassi-bess-evpn-igmp-mld-proxy-01," Internet-Draft, BESS Working Group, Oct. 28, 2016, 25 pp.

Saint-Andre, P., "Extensible Messaging and Presence Protocol (XMPP): Core" Internet Engineering Task Force (IETF) RFC 6120, Mar. 2011, 211 pp.

Aggarwal et al., "BGP Encodings and Procedures for Multicast in MPLS/BGP IP VPNs," RFC 6514, Internet Engineering Task Force (IETF), Feb. 2012, 59 pp.

* cited by examiner

MULTICAST VPN SUPPORT IN DATA CENTERS USING EDGE REPLICATION TREE

TECHNICAL FIELD

This disclosure generally relates to computer networks, and more specifically, to multicasting for distributed applications.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form.

Customer devices may connect to services provided by data centers. A typical data center comprises, for example, a facility that hosts applications and services for customers of the data center. The data center for example, hosts all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Software Defined Network (SDN) platforms may be used in data centers, and in some cases, may use a logically centralized and physically distributed SDN controller, and a distributed forwarding plane in virtual routers that extend the network from physical routers and switches in the data center into a virtual overlay network hosted in virtualized servers. The SDN controller provides management, control, and analytics functions of the virtualized network and orchestrates the virtual routers by communicating with the virtual routers.

Using multicasting, a network distributes multicast packets to a set of interested receivers that can be on different subnetworks and that are configured as members of a multicast group. In some examples, the network that distributes multicast packets may include a virtual private network (VPN), which may be used to extend two or more remote layer two (L2) customer networks (e.g., a source VPN site and a receiver VPN site) through an intermediate layer three (L3) network (usually referred to as a provider network), such as the Internet, in a transparent manner, i.e., as if the network does not exist. In particular, the VPN transports L2 communications, such as "frames," between customer networks via the network.

SUMMARY

In general, the disclosure describes techniques for seamless integration between a multicasting VPN network and an edge replicated multicast network. As further described herein, a receiver virtual private network (VPN) site (e.g., data center) may include a multicast replication network that provides edge replicated multicast using an edge replicated multicast tree (referred to herein as "ERM tree"). The edge replicated multicast may in some instances conform to an edge replicated multicast protocol, such as the edge replicated multicast for VPN protocol (referred to herein as "ERMVPN techniques") as described in P. Marques, et al., "Edge multicast replication for BGP IP VPNs," draft-marques-13vpn-mcast-edge-01," Network Working Group, June 2012, the entire contents of which are incorporated by reference herein. A source VPN site external to the data center may include an ingress multicast routing device, e.g., provider edge (PE) device that may implement, in some instances, a multicast protocol for a VPN, such as a BGP/MPLS IP VPN service that supports multicast known as multicast VPN (MVPN) as described in E. Rosen, et al., "Multicast in MPLS/BGP IP VPNs," Internet Engineering Task Force, Request for Comments 6513, February 2012, the entire contents of which are incorporated by reference herein, to send multicast traffic over an L3 VPN network. In this manner, the source VPN site can send multicast traffic, which may originate from a multicast source device, toward receivers of a multicast group.

As further described in this disclosure, a controller (e.g., software defined networking (SDN) controller) may facilitate the integration between a multicasting VPN network and an edge replicated multicast network. For example, the SDN controller may select of a bridge node (referred to herein as "multicast bridge node") from virtual routers specified in the multicast replication tree. The SDN controller may send information identifying the multicast bridge node to a provider edge (PE) device for the source VPN such that the PE device may use the information to steer multicast traffic from the source VPN site across the Layer 3 VPN network to the multicast bridge node of the receiver VPN site. The SDN controller sends the information, e.g., a corresponding label for the selected multicast bridge node and selected multicast bridge node's Internet Protocol (IP) address, to a remote multicast sender to stitch the MVPN and ERMVPN. When the multicast bridge node receives the multicast traffic with the multicast bridge node label, the multicast bridge node determines from the information that it is the multicast traffic is coming from outside the data center and that the multicast bridge node is configured to receive the multicast traffic. The multicast bridge node may also determine from the information to send the multicast traffic to local-receivers (e.g., virtual machines/containers) and to a parent node of the multicast bridge node indicated from the edge replicated multicast tree. In this way, the techniques may provide for an integrated multicasting network in which multicast traffic may seamlessly flow between a multicasting VPN network external to a data center and a multicast replication network internal to the data center.

In one example, a method comprises: receiving, by a software defined networking (SDN) controller of a data center including one or more devices each having one or more virtualized entities configured thereon, one or more multicast group membership messages that identify the one or more virtualized entities as receivers of a multicast group, wherein the data center is a receiver virtual private network (VPN) site to receive one or more multicast messages for the multicast group; generating, by the SDN controller, a multicast replication tree that is used by the one or more devices to replicate multicast traffic within the receiver VPN site, wherein the multicast replication tree is an overlay distribution tree for the multicast group, the multicast tree specifying a plurality of virtual routers as nodes of the multicast replication tree; selecting, by the SDN controller, a virtual router from the plurality of virtual routers to operate as a multicast bridge node, wherein the multicast bridge node is configured to receive the multicast traffic from a remote provider edge (PE) device for a source VPN site for the multicast group and to replicate the multicast traffic based on the multicast replication tree, wherein the source VPN site is external to the data center; and sending, by the SDN controller and to the remote PE device, information identifying the multicast bridge node that is used to steer the multicast traffic from the source VPN site to the multicast bridge node of the receiver VPN site.

In another example, a software defined networking (SDN) controller of a data center of a receiver virtual private network (VPN) site including one or more devices each having one or more virtualized entities configured thereon, the SDN controller comprising: one or more processors, wherein the one or more processors are configured to: receive one or more multicast group membership messages that identify the one or more virtualized entities as receivers of a multicast group; generate a multicast replication tree that is used by the one or more devices to replicate multicast traffic within the receiver VPN site, wherein the multicast replication tree is an overlay distribution tree for the multicast group, the multicast tree specifying a plurality of virtual routers as nodes of the multicast replication tree; select a virtual router from a plurality of virtual routers specified in the multicast replication tree to operate as a multicast bridge node, wherein the multicast bridge node is configured to receive the multicast traffic from a remote provider edge (PE) device for a source VPN site for the multicast group and to replicate the multicast traffic based on the multicast replication tree, wherein the source VPN site is external to the data center; and send, to the remote PE device, information identifying the multicast bridge node that is used to steer the multicast traffic from the source VPN site to the multicast bridge node of the receiver VPN site.

In yet another example, a device of a data center of a receiver virtual private network (VPN) site, the device comprising: a virtual router; one or more virtualized entities coupled to the virtual router; one or more processors, wherein the one or more processors are configured to: sending, to a software defined networking (SDN) controller, one or more multicast group membership messages that identify the one or more virtualized entities of the device as receivers of a multicast group; and receiving, from the SDN controller, configuration state information that causes the virtual router to, in response to receiving multicast traffic from a remote provider edge (PE) device for a source VPN site, replicate the multicast traffic based on a multicast replication tree, wherein the multicast traffic includes information identifying the virtual router as a multicast bridge node.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
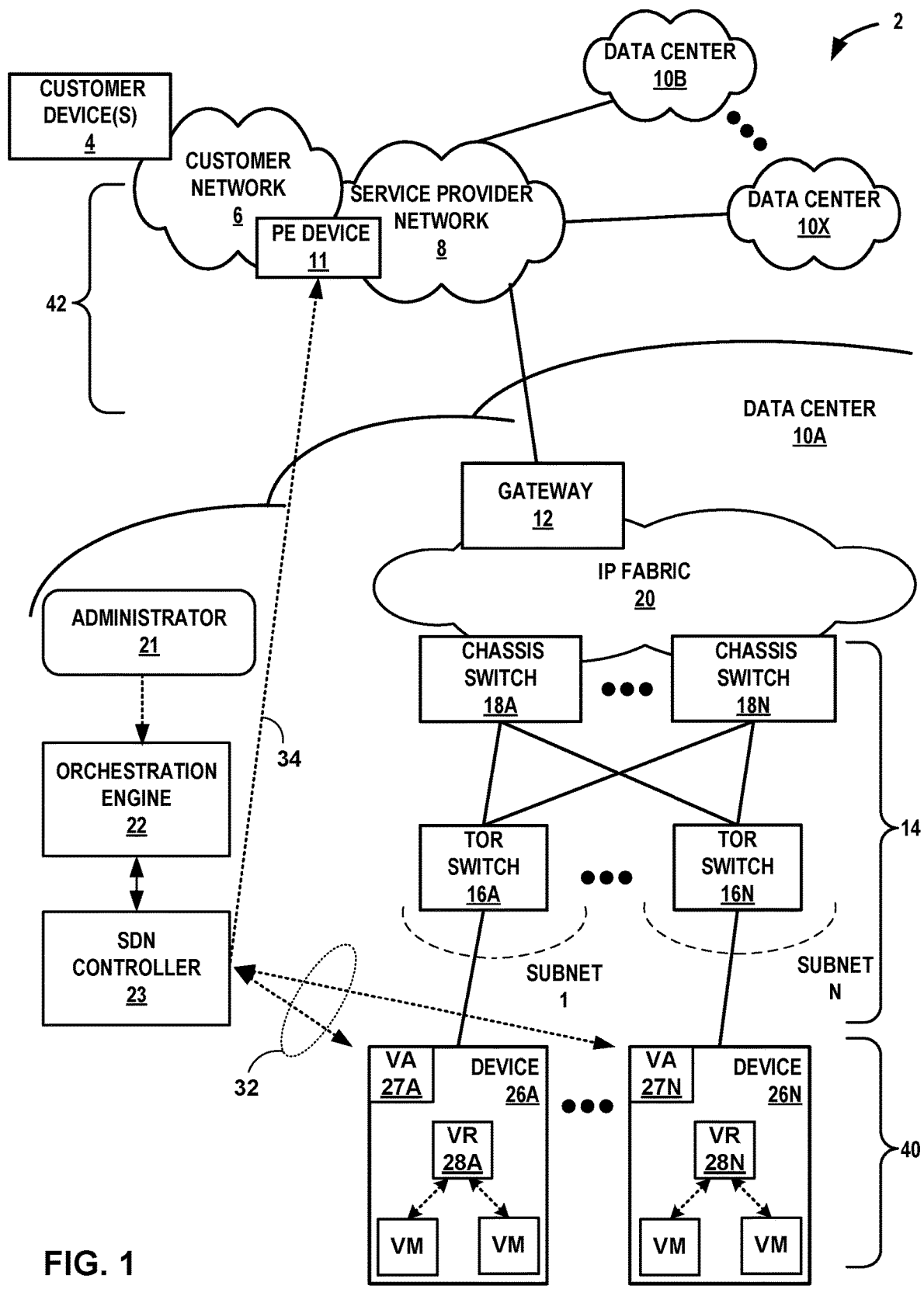
FIG. 1 is a block diagram illustrating an example network in which examples of the techniques described herein may be implemented.

FIG. 1 is a block diagram illustrating an example network 2 in which examples of the techniques described herein may be implemented. Network 2 in the example of FIG. 1 includes data centers 10A-10X (collectively, "data centers 10") interconnected with one another and with customer network 6 associated with one or more customer devices 4 ("customer devices 4") via a service provider network 8.

In the example of FIG. 1, network 2 comprises a customer network 6 that provides one or more customers with connectivity to data centers 10 via service provider network 8. A customer may represent, for instance, an enterprise, a government, a residential subscriber, or a mobile subscriber. Customer devices 4 may be, for example, personal computers, laptop computers or other types of computing device associated with the customers. In addition, customer devices 4 may comprise mobile devices that access the data services of service provider network 8 via a radio access network (RAN). Example mobile subscriber devices include mobile telephones, laptop or desktop computers having, e.g., a 3G or 4G wireless card, wireless-capable netbooks, video game device, pagers, smart phones, personal data assistants (PDAs) or the like. Each of customer devices 4 may run a variety of software applications, such as word processing and other office support software, web browsing software, software to support voice calls, video games, video conferencing, and email, among others. In the example of FIG. 1, customer network 6 may operate independently from other networks, such as service provider network 8 and data centers 10.

Service provider network 8 offers packet-based connectivity to customer devices 4 attached to customer network 6 for accessing data centers 10. Service provider network 8 may be coupled to one or more networks administered by other providers, and may thus form part of a large-scale public network infrastructure, e.g., the Internet. Service provider network 8 represents a Layer 3 (L3) network, where reference to a layer followed by a number refers to a corresponding layer in the Open Systems Interconnection (OSI) model. Service provider network is an L3 network in the sense that it natively supports L3 operations as described in the OSI model. Common L3 operations include those performed in accordance with L3 protocols, such as the internet protocol (IP). L3 is also known as a "network layer" in the OSI model and the "IP layer" in the TCP/IP model, and the term L3 may be used interchangeably with "network layer" and "IP" throughout this disclosure. Service provider network 8 may also implement Multi-Protocol Label Switching (MPLS) forwarding and, in such instances, may be referred to as an MPLS network or MPLS backbone. Service provider network 8 may alternatively be referred to as an "MPLS/IP core network." Although service provider network 8 is illustrated as a single network between data centers 10 and customer network 6, service provider network 8 may include multiple service provider networks to connect one or more customer devices 4 with data centers 10.

Provider edge (PE) device 11 of service provider network 8 provides customer devices 4 with access to data center 10A via service provider network 8. PE device 11 may utilize VPN technology through service provider network 8 to interconnect customer network 6 and data centers 10. In the example of FIG. 1, PE device 11 may represent a router, switch or other suitable network device that provides multicasting across service provider network 8 between VPN sites, as further described below.

Each of data centers 10 may, for example, host infrastructure equipment, such as networking and storage systems, redundant power supplies, and environmental controls. In some examples, each of data centers 10 may represent one of many geographically distributed network data centers. In some examples, each of data centers 10 may be individual network servers, network peers, or otherwise. As illustrated in the example of FIG. 1, each of data centers 10 may be a facility that provides network services for customer devices 4. For example, a network data center may host web services for several enterprises and end users. Other example services may include data storage, virtual private networks, traffic engineering, file service, data mining, scientific- or supercomputing, and so on. Customer devices 4 connect to gateway device 12 via customer network 6 and service provider network 8 to receive connectivity to services provided by data centers 10. Gateway device 12 redirects traffic flows to and from one or more data centers 10 that provide the network services.

In this example, each of data centers 10 includes a set of storage systems and application servers, e.g., devices 26A-26N (collectively, "devices 26"), interconnected via high-speed switch fabric 14 provided by one or more tiers of physical network switches and routers. Devices 26 function as compute nodes and/or servers of the data center. The terms "compute nodes" and "servers" are used interchangeably herein to refer to devices 26. Each of devices 26 may provide an operating environment for execution of one or more customer-specific virtualized entities, such as virtual machines ("VMs"), containers, or the like. In some examples, devices 26 may be bare metal servers (BMSs).

Switch fabric 14 is provided by a set of interconnected top-of-rack (TOR) switches 16A-16N (collectively, "TOR switches 16") coupled to a distribution layer of chassis switches 18A-18N (collectively, "chassis switches 18"). Although not shown, each of data centers 10 may also include, for example, one or more non-edge switches, routers, hubs, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide devices 26 with redundant (multi-homed) connectivity to IP fabric 20 and service provider network 8. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customer devices 4 via service provider network 8.

Data centers 10 may include a Software-Defined Network ("SDN") platform to control and manage network behavior. In some cases, an SDN platform includes a logically centralized and physically distributed SDN controller, e.g., SDN controller 23, and a distributed forwarding plane in the form of virtual routers, e.g., virtual routers 28A-28N (collectively, "VRs 28"), that extend the network from physical routers and switches in the data center switch fabric into a virtual overlay network hosted in virtualized servers. SDN controller 23 facilitates operation of one or more virtual networks within each of data centers 10, such as data center 10A, in accordance with one or more examples of this disclosure. Virtual networks are logical constructs implemented on top of the physical network of data center 10A. In some examples, virtual networks may be implemented as a virtual private network (VPN), virtual LAN (VLAN), or the like. In some examples, SDN controller 23 may operate in response to configuration input received from orchestration engine 22, which in turn operates in response to configuration input received from network administrator 21. Additional information regarding SDN controller 23 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, the entire contents of which is set forth herein.

In some examples, orchestration engine 22 manages application-layer functions of data center 10 such as managing compute, storage, networking, and application resources executing on servers 12. For example, orchestration engine 22 may attach virtual machines (VMs) to a tenant's virtual network and generally manage the launching, migration and deconstruction of the VMs as needed. Each virtual machine may be referred to as a virtualized application workload (or just application workload) and generally represents a virtualized execution element, such as a VM or a container. Orchestration engine 22 may connect a tenant's virtual network to some external network, e.g. the Internet or a VPN. Orchestration engine 22 may deploy a network service (e.g. a load balancer) in a tenant's virtual network.

In some examples, SDN controller 23 is a lower-level controller tasked with managing the network and networking services of data center 10A and, in particular, switch fabric 14 that provides connectivity between devices 26. SDN controller 23 utilizes a set of communication protocols to configure and control routing and switching elements of switch fabric 14 to create an overlay network, which generally refers to a set of tunnels for transporting packets to and from devices 26 within data center 10A.

One such communication protocol to configure the network (e.g., switch fabric 14, IP fabric 20, etc.) may include a messaging protocol such as Extensible Messaging and Presence Protocol (XMPP), for example. For example, SDN controller 23 implements high-level requests from orchestration engine 22 by configuring physical devices of data centers 10 (e.g. TOR switches 16, chassis switches 18, and switch fabric 14; physical routers; physical service nodes such as firewalls and load balancers; and virtual services such as virtual firewalls in a VM). SDN controller 23 maintains routing, networking, and configuration information within a state database. SDN controller 23 communicates a suitable subset of the routing information and configuration information from the state database to virtual router (VR) agents, e.g., virtual agents 27A-27N (collectively, "VAs 27"), on each of devices 26.

Typically, the traffic between any two network devices, such as between network devices within IP fabric 20 (not shown) or between devices 26 and customer devices 4 or between devices 26, for example, can traverse the physical network using many different paths. A packet flow (or "flow") can be defined by the five values used in a header of a packet, or "five-tuple," i.e., the protocol, Source IP address, Destination IP address, Source port and Destination port that are used to route packets through the physical network. For example, the protocol specifies the communications protocol, such as Transmission Control Protocol (TCP) or User Datagram Protocol (UDP), and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a TCP connection, all PDUs sourced by a particular MAC address or IP address, all PDUs having the same VLAN tag, or all PDUs received at the same switch port.

As described above, each of devices 26 includes a respective virtual router 28 that executes multiple routing instances for corresponding virtual networks within data center 10A and routes the packets to appropriate VMs executing within the operating environment provided by devices 26. Packets received by virtual router 28A of device 26A, for instance, from the underlying physical network fabric may include an outer header to allow the physical network fabric to tunnel the payload or "inner packet" to a physical network address for a network interface of device 26A that executes virtual router 28A. The outer header may include not only the physical network address of the network interface of device 26A but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In the example of FIG. 1, a customer device 4 may operate as a source for multicast traffic (referred to herein as "multicast source" or "multicast sender") to be delivered from a source VPN site to receivers of a receiver VPN site, e.g., data center 10A. In general, multicast network traffic is associated with specific multicast groups. More specifically, multicast traffic is typically designated by a unique combination for a particular multicast group and a particular source for the multicast group. For example, multicast network traffic, such as a particular multicast stream of content, may be uniquely designated with a (Source, Group), i.e., (S, G), label to designate a source of the traffic and a multicast group to which the traffic belongs.

In the example of FIG. 1, network 2 may include multicast virtual private network (MVPN) 42 in which routing devices are configured to send multicast traffic between a source and receivers over service provider network 8 running Layer 3 virtual private network. To enable routing of multicast traffic over a network running a Layer 3 virtual private network, multicast routing devices, e.g., PE device 11, may implement, for example, the multicast protocols as described in E. Rosen, et al., "BGP/MPLS IP Virtual Private Networks (VPNs)," RFC 4364, Internet Engineering Task Force (IETF), February 2006; and E. Rosen, et al., "Multicast in MPLS/BGP IP VPNs," RFC 6513, IETF, February 2012, the entire contents of each of which is incorporated by reference herein. RFC 6513 is referred to herein as "MVPN protocol." Although FIG. 1 is illustrated as implementing the MVPN protocol to provide multicasting in VPN, the techniques described herein may also be applicable to a network in which service provider network 8 implements multicasting techniques of an EVPN protocol, instead of an MVPN protocol.

In the example of FIG. 1, PE device 11 of MVPN 42 may implement the MVPN protocol to forward IP multicast traffic from its local source VPN site, e.g., customer network 6, to a remote receiver VPN site, e.g., data center 10A. By implementing the MVPN protocol, PE device 11 may distribute VPN routing information across service provider network 8 and use MPLS to forward multicast traffic across service provider network 8 to a remote VPN site, e.g., data center 10A. That is, the MVPN protocol is used by routing devices external to data center 10A to forward IP multicast traffic over the service provider network 8 running an L3 VPN.

As one example, PE device 11 may instantiate a Provider Multicast Service Interface (PMSI) that provides an overlay network on the service provider network 8 to tunnel (referred to herein as "P-tunnel") multicast traffic from customer network 6 across service provider network 8 to data center 10A. To instantiate the PMSI, PE device 11 typically discovers other routing devices of an MVPN instance using, for example, border gateway protocol (BGP) auto-discovery (AD) procedures or other auto-discovery techniques to establish the P-tunnel between the routing devices. For example, routing devices of an MVPN instance may advertise an Intra-Autonomous System I-PMSI AD route (MVPN Type 1 route) or an Inter-Autonomous System I-PMSI AD route (MVPN Type 2 route). Multicast traffic may be tunneled using, for example, Resource Reservation Protocol with traffic engineering (RSVP-TE) label-switched path (LSPs), protocol independent multicast (PIM) trees, multicast label distribution protocol (mLDP) point-to-multipoint (P2MP) trees, and/or mLDP multipoint-to-multipoint (MP2MP) LSPs.

Routing devices of the MVPN instance may exchange multicast state information (e.g., join/leave messages) for its local VPN sites to enable multicast traffic to be tunneled through the P-tunnel. Typically, routing devices implementing the MVPN protocol are required to implement protocol independent multicast (PIM) to learn multicast state information for the VPN sites to create a multicast distribution tree for the multicast state. However, in some examples, the receiver VPN site, e.g., data center 10A, does not implement PIM.

In the example of FIG. 1, data center 10A may include a multicast replication network 40 that provides a multicast service using an edge replicated multicast tree (referred to herein as "ERM tree") on a per-flow basis. Examples of edge replicated multicast are described in P. Marques, "Edge multicast replication for BGP IP VPNs," draft-marquest-13vpn-mcast-edge-01, Internet-Draft, Network Working Group, June 2012, the entire contents of which is incorporated by reference herein. The techniques described in the above draft is referred to herein as "ERMVPN techniques."

Using the ERMVPN techniques, an edge replicated multicast tree is built for an overlay network within data center 10A that does not rely on the underlying physical network to provide multicast capabilities. For example, an edge replicated multicast tree may specify the replication for one or more nodes, e.g., VRs 28. VRs 28 of devices 26 may use the edge replicated multicast tree to replicate multicast traffic for its local receivers, e.g., VMs. That is, ERMVPN techniques are used to replicate multicast traffic within data center 10A.

The ERMVPN techniques are used in some instances to provide a more efficient way to replicate multicast traffic. For example, an edge replicated multicast tree has an upper bound placed on the number of copies that a particular node, e.g., VR 28A, has to generate in contrast with ingress replication in which an ingress device generates a replica packet for each receiver in the multicast group. An edge replicated multicast tree may comprise a K-ary tree where each of the virtual routers within a data center is responsible to generate up to K replicas. For a multicast group with m receivers, the height of the tree is approximately "log K(m)," where the height of the tree determines the maximum number of forwarding hops required to deliver a packet to the receiver.

To facilitate the configuration of an edge replicated multicast tree, SDN controller 23 may generate an edge replicated multicast tree based on multicast group membership messages (e.g., Internet Group Management Protocol (IGMP) join/leave messages) of receivers such as VMs. Additional details of IGMP are described in "Host Extensions for IP Multicasting," RFC 1112, Internet Engineering Task Force (IETF), August 1989; "Internet Group Messaging Protocol, Version 2," RFC 2236, IETF, November 1997; "Internet Group Management Protocol, Version 3," RFC 3376, IETF, October 2002; and "Using Internet Group Management Protocol Version 3 (IGMPv3) and Multicast Listener Discovery Protocol Version 2 (MLDv2) for Source-Specific Multicast," RFC 4604, IETF, August 2006; and "IGMP and MLD Proxy for EVPN," draft-sajassi-bess-evpn-igmp-mld-proxy-01, Oct. 28, 2016, the entire contents of each of which is incorporated by reference herein.

For example, when one or more VMs are provisioned on device 26A, the VMs may send IGMP join messages to device 26A to join a multicast group to receive multicast traffic. Virtual agents 27A of device 26A may snoop the IGMP messages, convert the IGMP messages to ERMVPN join messages and sends the ERMVPN join messages using to SDN controller 23 (illustrated in FIG. 1 as messages 32). Similarly, virtual agent 27N of device 26N may snoop the IGMP join messages of VMs, convert the IGMP messages to ERMVPN join messages and sends the ERMVPN join messages using XMPP (also illustrated in FIG. 1 as messages 32) to SDN controller 23. Using the multicast state information received from devices 26, SDN controller 23 may configure an edge replicated multicast tree that is sent to virtual agents 27 of devices 26 such that VRs 28 of devices 26 may use the edge replicated multicast tree to perform edge replicated multicast.

Without the techniques described in this disclosure, an MVPN network and multicast replication network are not seamlessly integrated to enable multicast traffic to seamlessly flow between the MVPN network external to a data center and multicast replication network implemented within the data center. In accordance with the techniques described herein, SDN controller 23 may seamlessly integrate the MVPN 42 (e.g., implementing the MVPN protocol) and multicast replication network 40 (e.g., implementing the ERMVPN techniques) to enable multicast traffic to seamlessly flow from a multicast source of a source VPN site across an L3 VPN network to a bridge node (referred to herein as "multicast bridge node") of a receiver VPN site, which in turn performs multicast replication within the receiver VPN site. As further described below, SDN controller 23 may select a virtual router from a plurality of virtual routers specified in an edge replicated multicast tree to function as a multicast bridge node, and send information identifying the multicast bridge node to an ingress multicast routing device of MVPN 42, e.g., PE device 11. As a result, PE device 11 may use the information identifying the multicast bridge node to steer multicast traffic received from a customer device, e.g., customer device 4, of a source VPN site to the multicast bridge node of the receiver VPN site, which in turn performs edge replicated multicast on the received multicast traffic for the virtualized entities of data center 10A. In this manner, a multicast bridge node is a node that bridges a multicasting VPN network implemented externally to data center 10A and a multicast replication network implemented internally in data center 10A.

As described above, SDN controller 23 may configure an edge replicated multicast tree for devices 26 within a receiver VPN site, e.g., data center 10A, to enable VRs 28 of devices 26 to perform edge replicated multicast on multicast traffic for virtualized entities, e.g., VMs, of data center 10A. SDN controller 23 may select, for example, VR 28A of device 26A from virtual routers specified in the edge replicated multicast tree to function as a multicast bridge node (also referred to herein as "forest node") between MVPN 42 and multicast replication network 40. The multicast bridge node is configured to receive multicast traffic from an ingress multicast routing device, e.g., PE device 11, external to data center 10A, and to perform edge replicated multicast on the received multicast traffic for VMs within data center 10A. In some examples, the multicast bridge node is selected as a node that does not have any children in the edge replicated multicast tree. For example, SDN controller 23 may select a right-most and bottom-most node in the edge replicated multicast tree since this node does not have any children and may have only one parent (e.g., another virtual router).

SDN controller 23 may send, to PE device 11, information 34 identifying the multicast bridge node (referred to herein as "information 34" or "multicast bridge node information 34"). For example, information 34 may comprise a label identifying VR 28A of device 26A (referred to herein as "multicast bridge node label") and/or an IP address of VR 28A. In some example implementations in which PE device 11 uses the MVPN protocol to send traffic to different VPN sites, SDN controller 23 may send a leaf auto-discovery (AD) route (e.g., MVPN Type 4 route/PMSI tunnel advertisement route) including the multicast bridge node label and IP address of VR 28A. In other example implementations in which service provider network 8 provides Ethernet VPN (EVPN), SDN controller 23 may send to PE device 11 a Selective Multicast Ethernet Tag Route (SMET) (e.g., EVPN Type 6 route) including the multicast bridge node label and IP address of VR 28A.

PE device 11 may receive information 34 from SDN controller 23 and in response to receiving the information, PE device 11 configures its forwarding information to encapsulate information 34 to multicast traffic received from the multicast source, e.g., customer device 4, for the multicast group. In this way, when PE device 11 receives multicast traffic from customer device 4, PE device 11 is configured to send the multicast traffic encapsulated with information 34 to steer the multicast traffic to VR 28A of device 26A.

When VR 28A receives the multicast traffic, VR 28A may determine from information 34 that VR 28A is the multicast bridge node and performs edge replicated multicast using the edge replicated multicast tree. For example, VR 28A may determine from the multicast bridge node label included in the multicast traffic (and the outer source IP address) that the multicast traffic is coming from outside data center 10A, that VR 28A is the multicast bridge node, and that the multicast traffic is to be sent to local receivers (e.g., VMs) and a parent node (e.g., another virtual router such as VR 28N) of the multicast bridge node, which in turn may replicate the packet to all its local-receivers (e.g., VMs) and other child nodes (e.g., other virtual routers) identified in the edge replicated multicast tree. edge replicated multicastIn other examples in which one or more of devices 26 are bare metal servers, VR 28A may also send the multicast traffic to the bare metal servers connected in the L2 domain.

In this way, by selecting a virtual router specified in the edge replicated multicast tree to function as a multicast bridge node to receive multicast traffic and sending information identifying the multicast bridge node to the ingress PE device, SDN controller 23 may facilitate an integrated multicasting network in which multicast traffic may seamlessly flow between a multicasting VPN network and a multicast replication network, including in a system in which the multicasting VPN network is external to a data center network and the multicast replication network is internal to the data center network.

Figure 2:
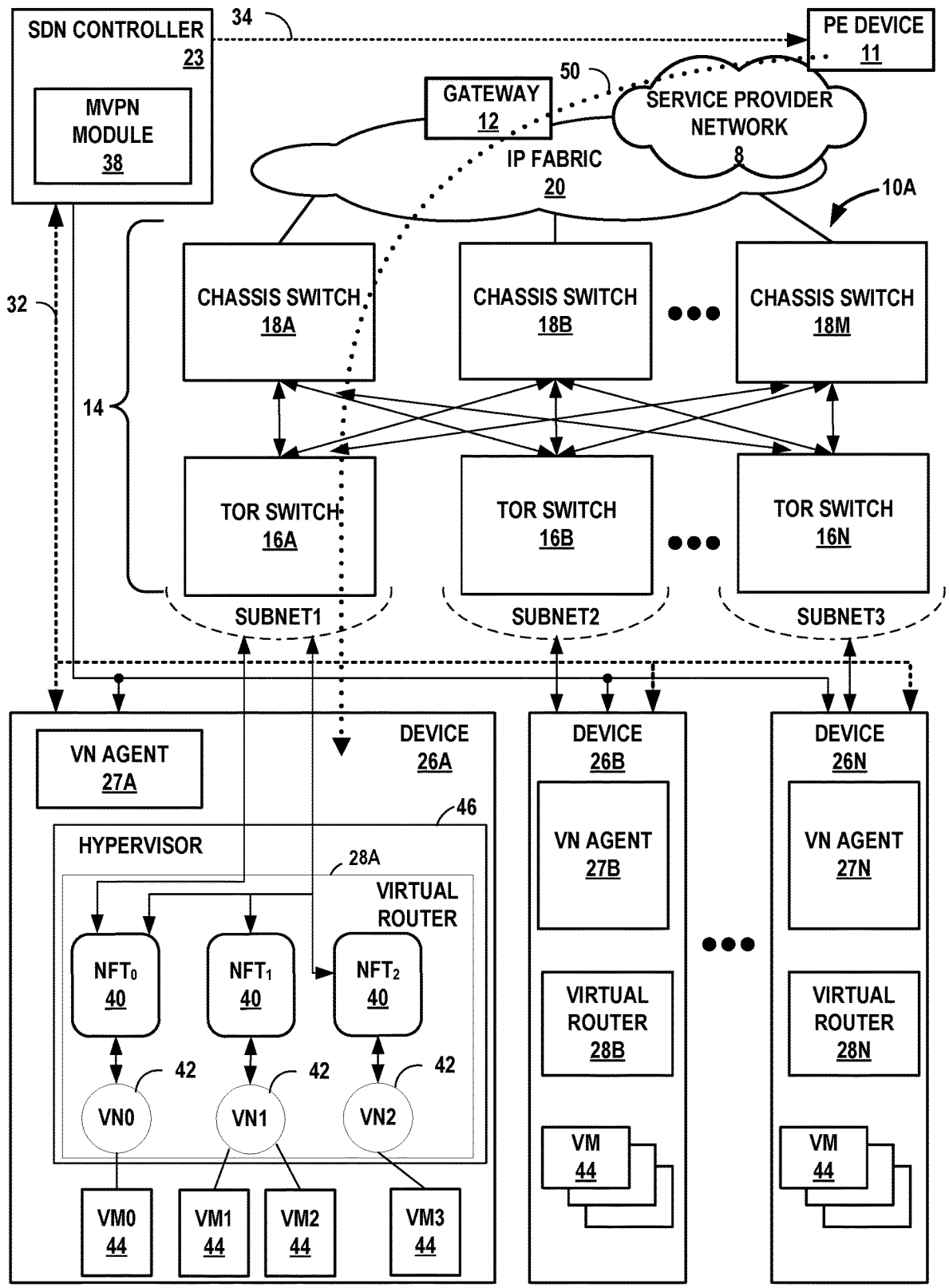
FIG. 2 is a block diagram illustrating an example implementation of the data center of FIG. 1 in further detail, in accordance with techniques described in this disclosure.

FIG. 2 is a block diagram illustrating an example implementation of data center 10A of FIG. 1 in further detail. In the example of FIG. 2, data center 10A includes interconnections that extend switch fabric 14 from physical switches 16, 18 to software or virtual routers 28. Virtual routers 28 dynamically create and manage one or more virtual networks 42 usable for communication between application instances. In one example, virtual routers 28 execute the virtual network as an overlay network, which provides the capability to decouple an application's virtual address from a physical address (e.g., IP address) of the one of devices 26A-26N on which the application is executing. Each virtual network may use its own addressing and security scheme and may be viewed as orthogonal from the physical network and its addressing scheme. Various techniques may be used to transport packets within and across virtual networks 42 over the physical network.

Each virtual router 28 may execute within a hypervisor, a host operating system or other component of each of devices 26. Each of devices 26 may represent an x86 or other general-purpose or special-purpose server capable of executing virtual machines 44. In the example of FIG. 2, device 26A executes within hypervisor 46, also often referred to as a virtual machine manager (VMM), which provides a virtualization platform that allows multiple operating systems to concurrently run on one of devices 26. In the example of FIG. 2, device 26A manages virtual networks 42, each of which provides a network environment for execution of one or more virtual machines (VMs) 44 on top of the virtualization platform provided by hypervisor 46. Each VM 44 is associated with one of the virtual networks VN0-VN2 and may represent tenant VMs running customer applications such as Web servers, database servers, enterprise applications, or hosting virtualized services used to create service chains. In some cases, any one or more of devices 26 or another computing device may host customer applications directly, i.e., not as virtual machines. In some cases, some of VMs 44 may represent containers, another form of virtualized execution environment. That is, both virtual machines and containers are examples of virtualized execution environments for executing application workloads.

In general, each VM 44 may be any type of software application and may be assigned a virtual address for use within a corresponding virtual network 42, where each of the virtual networks may be a different virtual subnet provided by virtual router 28A. A VM 44 may be assigned its own virtual layer three (L3) IP address, for example, for sending and receiving communications but may be unaware of an IP address of the physical device 26A on which the virtual machine is executing. In this way, a "virtual address" is an address for an application that differs from the logical address for the underlying, physical computer system, e.g., device 26A.

In one implementation, each of devices 26 includes a corresponding one of virtual network (VN) agents 27A-27N (collectively, "VN agents 27") that controls virtual networks 42 and that coordinates the routing of data packets within the device. In general, each VN agent 27 communicates with virtual SDN controller 23, which generates commands to control routing of packets through data center 10A. VN agents 27 may operate as a proxy for control plane messages between virtual machines 44 and SDN controller 23. For example, a VM 44 may request to send a message using its virtual address via the VN agent 27A, and VN agent 27A may in turn send the message and request that a response to the message be received for the virtual address of the VM 44 that originated the first message. In some cases, a VM 44 may invoke a procedure or function call presented by an application programming interface of VN agent 27A, and the VN agent 27A may handle encapsulation of the message as well, including addressing.

In one example, network packets, e.g., layer three (L3) IP packets or layer two (L2) Ethernet packets generated or consumed by the instances of applications executed by virtual machines 44 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet."

Encapsulation and/or de-capsulation of virtual network packets within physical network packets may be performed within virtual routers 28, e.g., within the hypervisor or the host operating system running on each of device 26. For example, virtual routers 28 may use MPLSoUDP or MPLSoGRE to transport packets within and across virtual networks 42 over the physical network.

As noted above, SDN controller 23 provides a logically centralized controller for facilitating operation of one or more virtual networks within data center 10A. SDN controller 23 may, for example, maintain a routing information base, e.g., one or more routing tables that store routing information for the physical network as well as one or more networks of data center 10A. Similarly, switches 16, 18 and virtual routers 28 maintain routing information, such as one or more routing and/or forwarding tables. In one example implementation, virtual router 28A of hypervisor 46 implements a network forwarding table (NFT) 40 for each virtual network 42. In general, each NFT 40 stores forwarding information for the corresponding virtual network 42 and identifies where data packets are to be forwarded and whether the packets are to be encapsulated in a tunneling protocol, such as with a tunnel header that may include one or more headers for different layers of the virtual network protocol stack.

In accordance with aspects of the techniques described herein, in one example SDN controller 23 includes MVPN module 38 that may select a multicast bridge node, e.g., VR 28A, from among a plurality of virtual routers specified in an edge replicated multicast tree, and send information 34 identifying the multicast bridge node to ingress PE device 11 such that PE device 11 may use the information 34 to steer multicast traffic from a source VPN site (e.g., customer device 4 of FIG. 1) across a Layer 3 VPN network, e.g., service provider network 8, to VR 28A of device 26A of the receiver VPN site, which in turn is configured to, in response to receiving the multicast traffic via MVPN, perform edge replicated multicast on the received multicast traffic to VMs 44 of data center 10A.

MVPN module 38 may facilitate the configuration of an edge replicated multicast tree based on multicast group membership messages (e.g., IGMP join/leave messages) received from devices 26. As one example, VMs 44 may send IGMP joins (or leaves) towards VR 28A. VR 28A terminates these IGMP messages, translates this information to ERMVPN messages, and sends the ERMVPN messages to SDN controller 23 using XMPP. More specifically, VN agent 27A may snoop IGMP join messages for VMs 44 of device 26A requesting to join a multicast group to receive multicast traffic from the multicast source. VN agent 27A may convert the IGMP join messages into ERMVPN join messages and send the ERMVPN join messages using XMPP (e.g., messages 32) to SDN controller 23. Similarly, VN agent 27N may snoop IGMP join messages for VMs 44 of device 26N requesting to join the same multicast group. VN agent 27N may convert information from the snooped IGMP join messages into ERMVPN join messages and send the ERMVPN join messages using XMPP (e.g., messages 32) to SDN controller 23. MVPN module 38 may use the multicast state information received from VN agents 27 and configure an edge replicated multicast tree for virtual routers of devices 26 to perform edge replicated multicast for VMs 44 belonging to the multicast group.

MVPN module 38 may select a virtual router from a plurality of virtual routers specified in the edge replicated multicast tree to function as a multicast bridge node. As the multicast bridge node, the selected virtual router is designated to receive multicast traffic from an ingress multicast routing device and perform edge replicated multicast to send the multicast traffic to interested receivers within data center 10A. For example, MVPN module 38 may select VR 28A of device 26A from the edge replicated multicast tree to receive multicast traffic from an ingress multicast routing device, e.g., PE device 11, and to perform edge replicated multicast for VMs 44 of data center 10A.

MVPN module 38 may instruct SDN controller 23 to send configuration state information that causes VR 28A, as the selected multicast bridge node, to receive multicast traffic from gateway 12 over a GRE/UDP tunnel and then flood the multicast traffic to nodes (e.g., VMs 44) specified in the multicast replication tree. MVPN module 38 may instruct SDN controller 23 to send information 34 identifying the selected multicast bridge node VR 28A to PE device 11. Information 34 may include a label of the selected multicast bridge node VR 28A and an IP address of the selected multicast bridge node VR 28A to PE device 11. In some example implementations in which service provider network 8 uses the MVPN protocol, to convey the information identifying the selected multicast bridge node, SDN controller 23 may send a leaf auto-discovery (AD) route including the label and/or IP address of VR 28A. In other example implementations in which service provider network 8 uses EVPN, to convey the information identifying the selected multicast bridge node, SDN controller 23 may send a Selective Multicast Ethernet Tag Route (EVPN Type 6 route) including the label and IP address of VR 28A. For example, SDN controller 23 may include an EVPN module (not shown) that implements the EVPN protocol to transport L2 communications (e.g., SMET routes) through an intermediate L3 network, e.g., service provider network 8, to PE device 11. SDN controller 23 may in some instances implement the MVPN protocol, the EVPN protocol, or a combination of both.

When PE device 11 receives multicast traffic from the source VPN site, PE device 11 may encapsulate the multicast traffic with at least a portion of information 34 identifying the selected multicast bridge node VR 28A, which was provided to PE device 11 by SDN controller 23. PE device 11 tunnels (e.g., via an MVPN P-tunnel) the multicast traffic 50 encapsulated with information 34 across service provider network 8 to gateway 12. Gateway 12 may tunnel the multicast traffic 50 over a GRE/UDP tunnel to VR 28A.

When VR 28A of device 26A receives the multicast traffic 50, VR 28A may determine from the information 34 encapsulating the multicast traffic 50 that VR 28A is to receive the multicast traffic and to perform edge replicated multicast. For example, VR 28A is configured to determine based on the label encapsulating the multicast traffic 50, or based on its own IP address being the destination, that VR 28A is the intended recipient, and in turn VR 28A performs edge replicated multicast using the edge replicated multicast tree by replicating multicast traffic 50 for its local VMs, e.g., VMs 44. VR 28A may then forward the multicast traffic 50 to another one of virtual routers, e.g., VR 26B, that is indicated as a parent node of the multicast bridge node, such that VR 28B may replicate the multicast traffic 50 for VR 28B's local VMs and send to one or more parent nodes and/or one or more child nodes of VR 28B, e.g., VR 28N, that are indicated in the edge replicated multicast tree.

Figure 3:
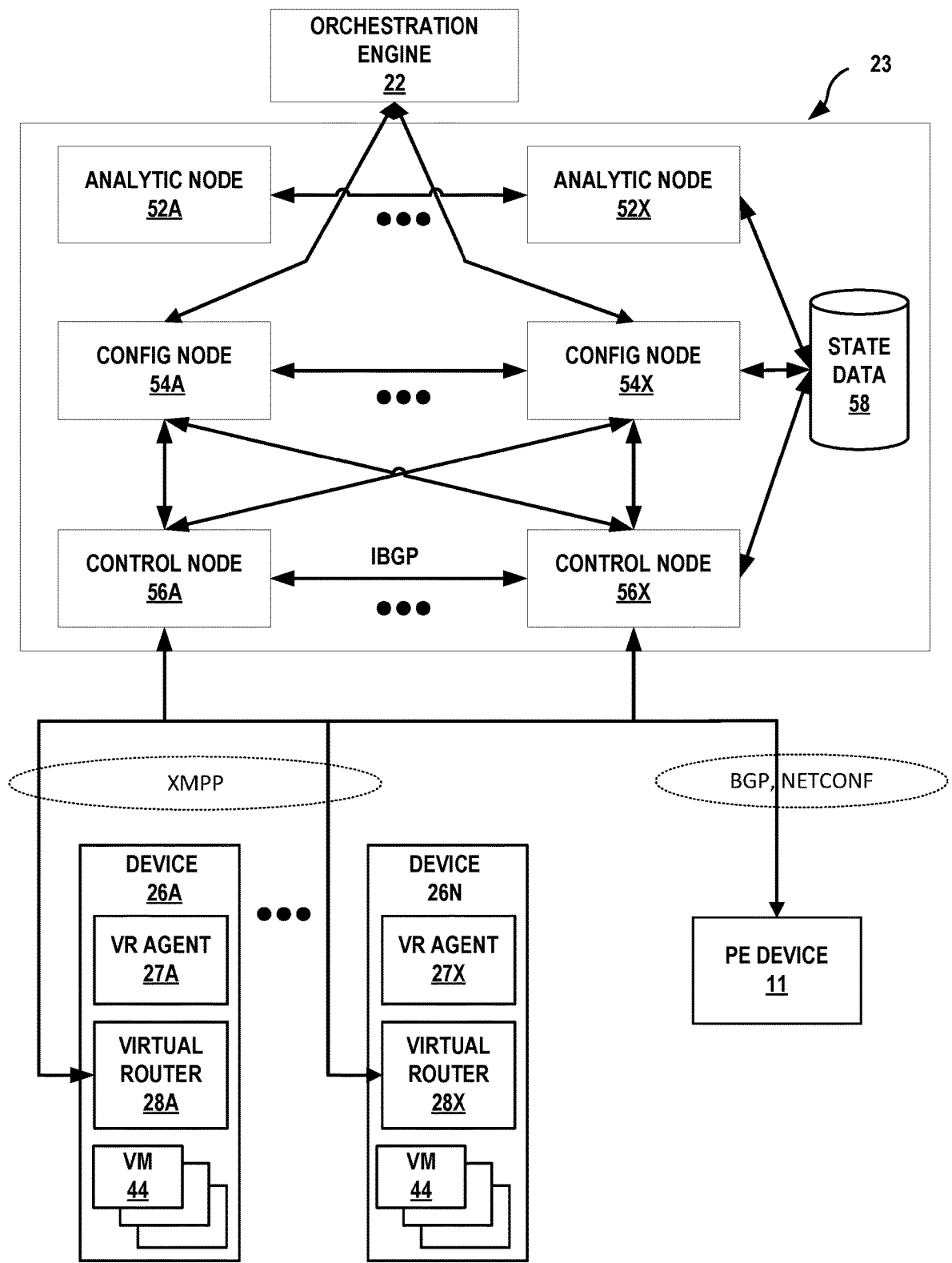
FIG. 3 is a block diagram illustrating an example of an SDN controller of FIGS. 1-2 in further detail, in accordance with techniques described in this disclosure.

FIG. 3 is a block diagram illustrating an example implementation of the SDN controller of FIG. 1, in accordance with the techniques described herein. In the example of FIG. 3, SDN controller 23 includes one or more analytic nodes 52A-52X (collectively, "analytic nodes 52"), one or more configuration nodes 54A-54X (collectively, "configuration nodes 54") and control nodes 56A-56X (collectively, "control nodes 56"). In general, each of the nodes 52, 54, and 56 may be implemented as a separate software process, and the nodes may be distributed across multiple hardware computing platforms that provide an environment for execution of the software. Moreover, each of the nodes maintains state data 58, which may be stored within a centralized or distributed database. In some examples, state database 58 is a NoSQL database. In some examples, state database 58 is a database cluster.

In general, analytic nodes 52 are tasked with collecting, storing, correlating, and analyzing information from virtual and physical network elements within data center 10. This information may include statistics, logs, events, and errors for use in managing the routing and network configuration of data center 10. Analytic nodes 52 store this information in state database 58.

Configuration nodes 54 translate the high-level data model of orchestration engine 22 into lower level models suitable for interacting with network elements, such as physical switches 16, 18 and VR agents 27. Configuration nodes 54 keep a persistent copy of the configuration state of SDN controller 23 within state database 58.

Control nodes 56 implement a logically centralized control plane responsible for maintaining ephemeral network state. Control nodes 56 interact with each other and with network elements, such as VR agents 27 and virtual routers 28 of devices 26 (e.g., compute nodes), to ensure that the network state is eventually consistent with desired state as specified by orchestration engine 22. In general, control nodes 56 receive configuration state information of SDN controller 23 from configuration nodes 54, and exchange routes with each other via IBGP to ensure that all control nodes 56 have the same network state. Further, control nodes 56 exchange routes with VR agents 27 on devices 26 via XMPP. Control nodes 56 also communicate the configuration state information, such as routing instances and forwarding policy, to VR agents 27, e.g., via XMPP, for installation within respective virtual routers 28. Further, control nodes 56 exchange routes (e.g., MVPN routes) with PE device 11 via BGP, and exchange the configuration state of SDN controller 32 with service nodes 21 via NETCONF.

Configuration nodes 54 provide a discovery service that customer devices 4 may use to locate various services available within the network. For example, if VR agent 27A attempts a connection with control node 56A, it uses a discovery service provided by configuration nodes 54 to discover the IP address of control node 56A. Clients executing on VMs 44 may use local configuration, Dynamic Host Configuration Protocol (DHCP) or Domain Name System (DNS) to locate the service discovery server within configuration nodes 54.

In some examples, configuration nodes 54 present northbound Application Programming Interface (API) that interfaces with orchestration engine 22. Orchestration engine 22 uses this interface to install configuration state using the high-level data model. Configuration nodes 54 further include a message bus to facilitate communications amongst internal components. Configuration nodes 54 further include a transformer that discovers changes in the high-level model of orchestration engine 22 and transforms these changes into corresponding changes in the low-level data model managed by SDN controller 23. Configuration nodes 54 further include an IF-MAP server that provides a southbound API to push computed low-level configuration down to control nodes 56. Furthermore, configuration nodes 54 include a distributed applications manager used to allocate unique object identifiers and to implement transactions across data center 10.

In accordance with the techniques of this disclosure, each of the control nodes 56 may be configured to receive multicast group membership messages from devices 26, e.g., IGMP join messages via XMPP, generate a multicast replication tree (e.g., edge replicated multicast tree) based on the multicast group membership information, select a multicast bridge node from virtual routers specified in the edge replicated multicast tree, and send information identifying the multicast bridge node to an ingress multicast routing device, e.g., PE device 11.

As one example, control nodes 56 establish XMPP sessions with devices 26 to receive multicast group membership messages. For example, VMs 44 may send IGMP joins (or leaves) towards VR 28A. VR 28A terminates these IGMP messages, translates this information to ERMVPN messages, and sends the ERMVPN messages to SDN controller 23 using XMPP. More specifically, VN agents 27 may snoop IGMP join messages for VMs 44 requesting to join a multicast group to receive multicast traffic. VN agents 27 may convert the IGMP join messages into XMPP messages and send the XMPP messages to control node 56A.

As further described in FIG. 4 below, control nodes 56 may include an MVPN module to generate a multicast replication tree for devices 26. The MVPN module may select from one of virtual routers 28, e.g., virtual router 28A, specified in the multicast replication tree to function as a multicast bridge node, i.e., to receive multicast traffic sent from PE device 11 and to perform edge replicated multicast.

Control nodes 56 may use the XMPP sessions to send configuration state information to VR agent 27A of device 26A to configure virtual router 28A to function as the multicast bridge node. For example, control nodes 56 may send configuration state information that causes virtual router 28A to, in response to receiving multicast traffic encapsulated with information identifying virtual router 28A as the multicast bridge node, flood the multicast traffic to nodes (e.g., VMs 44) specified in the multicast replication tree.

Control nodes 56 may also establish a BGP session with PE device 11 to send information identifying the multicast bridge node. For example, control nodes 56 may send to PE device 11 a leaf auto-discovery (AD) route (e.g., MVPN Type 4 route/PMSI tunnel advertisement route) including the multicast bridge node label and IP address of the multicast bridge node, e.g., virtual router 28A. In other example implementations in which service provider network 8 provides Ethernet VPN (EVPN), SDN controller 23 may send a Selective Multicast Ethernet Tag Route (SMET) (e.g., EVPN Type 6 route) including the multicast bridge node label and IP address of virtual router 28A. In this way, PE device 11 may use the information identifying the multicast bridge node to steer multicast traffic from the source VPN site toward the multicast bridge node of the receiver VPN site, which in turn performs edge replicated multicast.

The architecture of SDN controller 23 illustrated in FIG. 3 is shown for purposes of example only. The techniques as set forth in this disclosure may be implemented in the example data center 10 of FIG. 3, as well as other types of data centers not described specifically herein. Nothing in this disclosure should be construed to limit the techniques of this disclosure to the example architecture illustrated by FIG. 3.

Figure 4:
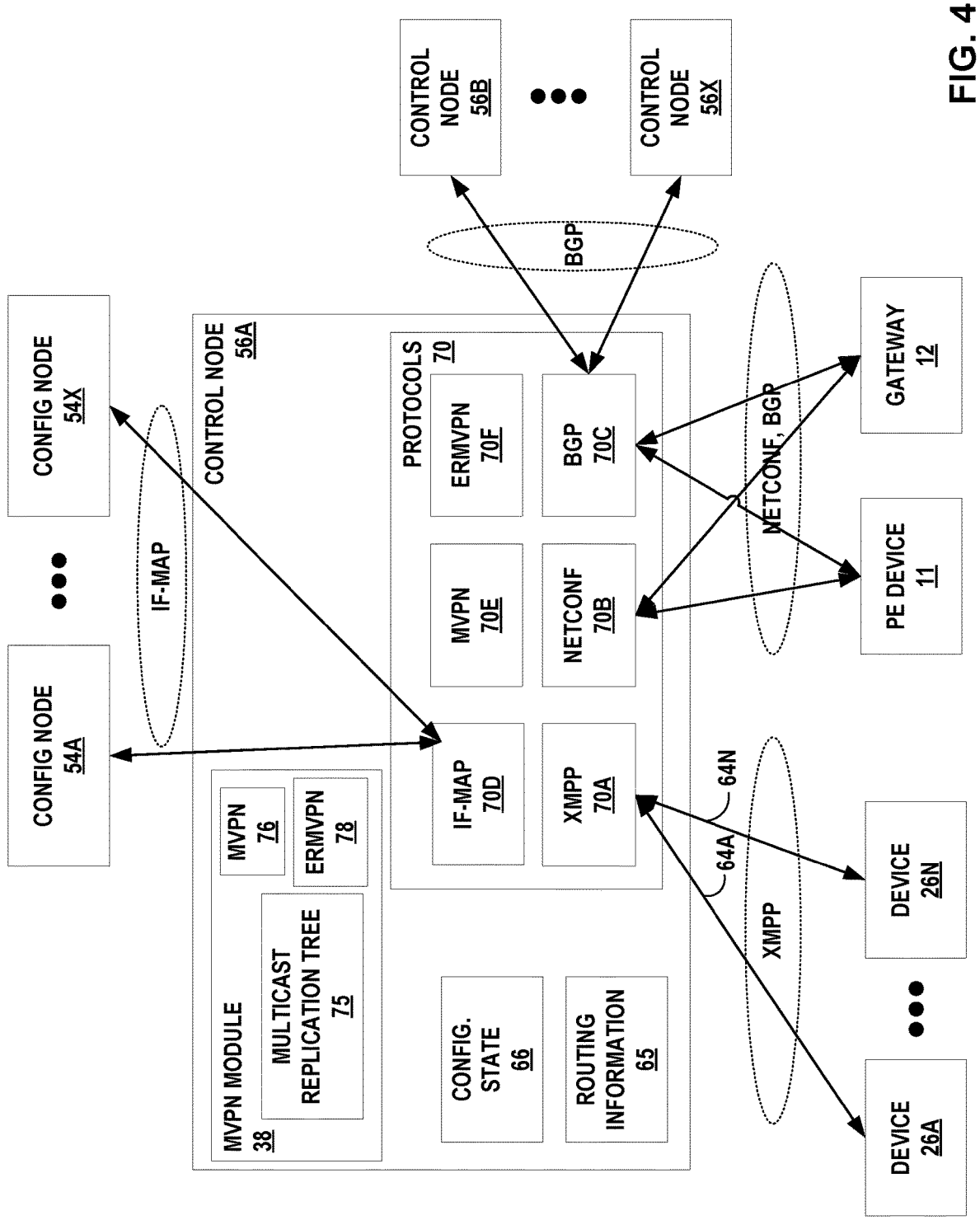
FIG. 4 is a block diagram illustrating an example of a control node of an SDN controller of FIG. 3 in further detail, in accordance with techniques described in this disclosure.

FIG. 4 is a block diagram illustrating an example of control node 56 of FIG. 3 in further detail, in accordance with the techniques of this disclosure. Control node 56A configured to communicate with multiple other types of nodes, including configuration nodes 54A-54X ("congig. nodes 54"), other control nodes 56B-56X, devices 26A-26N, and PE device 11.

Control node 56A provides an operating environment for protocols 70 to execute. Protocols 70 may include, for example, an XMPP process 70A, a NETCONF protocol process 70B, a BGP process 70C, an IF-MAP process 70D, MVPN protocol 70E, and ERMVPN techniques 70F.

Control node 56A receives configuration state from the configuration nodes 54 using IF-MAP 70D. Control node 56A exchanges routes with other control nodes 56 using BGP 70C to ensure that all control nodes have the same network state. Control node 56A exchanges routes with the virtual router agents on the devices 26 using XMPP 70A. Control node 56A also uses XMPP to send configuration state such as routing instances and forwarding policy. Control node 56A exchanges routes with PE device 11 using BGP 70C. Control node 56A also sends configuration state to PE device 11 using NETCONF 70B.

Control node 56A receives configuration information from one or more of config. nodes 54 using Interface to Metadata Access Points (IF-MAP) process 70D. IF-MAP process 70D may include circuitry for executing software instructions for sending and receiving communications from config nodes 54 in accordance with the IF-MAP protocol. IF-MAP process 70D stores the configuration information received from configuration nodes 54 to configuration state 66 ("CONFIG. STATE 66").

Control node 56A exchanges BGP messages with BGP peers, including control nodes 56B-56X and PE device 11 using BGP process 70C. BGP process 70C may include circuitry for executing software instructions for sending and receiving BGP messages with PE device 11 and control nodes 56B-56X in accordance with the BGP protocol. BGP process 70C stores routing information received from BGP route advertisements from PE device 11 (e.g., MVPN Type 1 or Type 2 AD routes) and control nodes 56B-56X to routing information 65.

Control node 56A exchanges messages with devices 26 using XMPP process 70A in accordance with XMPP. Control node 56A exchanges the messages via XMPP sessions 64A-64N ("XMPP sessions 64"). Devices 26 of FIG. 3 may correspond to devices 26 of FIGS. 1-3. XMPP process 70A may include circuitry for executing software instructions for exchanging XMPP messages with devices 26 in accordance with the XMPP protocol. XMPP is described in further detail in P. Saint-Andre, Extensible Messaging and Presence Protocol (XMPP): Core, IETF RFC 6120, March 2011, the entire contents of which is incorporated by reference herein. Control node 56A (and more specifically, XMPP process 70A of control node 56A) may serve as an XMPP client or an XMPP server relative to one of devices 26, depending on the context. For example, control node 56A may act as an XMPP server, and devices 26 may be XMPP clients that subscribe to information published by control node 56A, such as configuration information from configuration state 66 for individual devices 26 and routing information from routing information 65 that pertains to individual devices 26. As another example, control node 56A may act as an XMPP client to one or more of devices 26 as XMPP servers, in which control node 56A subscribes to information published by devices 26, such as routing information learned by devices 26 from other sources. XMPP process 70A receives routes from device 26A via XMPP session 64A and stores the routes to routing information 65. Routes learned by XMPP process 70A may be leaked to BGP process 70C, and BGP process 70C in turn may send to its BGP peers BGP routing advertisements that advertise the routes in routing information 65 learned from devices 26 via XMPP. In some examples, NETCONF process 70B of control node 56A enables control node 56A to communicate with PE device 11 via the NETCONF protocol.

In accordance with the techniques of this disclosure, control node 56A may include an MVPN module 38 that manages an MVPN instance for the MVPN network 42 and an ERMVPN instance for the multicast replication network 40. To manage the MVPN instance, MVPN module 38 may maintain a list of MVPN neighbors, manage locally originated MVPN AD routes used to discover devices that belong to a given MVPN instance, manage locally originated leaf AD routes (e.g., MVPN Type-4 routes). MVPN module 38 may also listen to all changes to the MVPN instance (e.g., MVPN neighborship information), handle initialization or cleanup when MVPN configuration is added or deleted in a virtual network, and provides data for inspection at run-time via introspect. MVPN module 38 may include, e.g., MVPN information 76 that includes MVPN AD routes such as Intra-AS I-PMSI AD routes (e.g., Type 1 MVPN AD route) that are exchanged by devices within the same autonomous system (e.g., iBGP neighbors) to participate in the MVPN instance, and/or Inter-AS I-PMSI (e.g., Type 2 MVPN AD route) that are exchanged by devices within different autonomous systems (e.g., eBGP neighbors) to participate in the MVPN instance, as described in R. Aggarwal, et. al., "BGP Encodings and Procedures for Multicast in MPLS/BGP IP VPNs," Internet Engineering Task Force (IETF), RFC 6514, February 2012, the entire contents of which is incorporated by reference herein. For example, MVPN module 38 may store the IP address of routers, e.g., PE device 11, that belong to an MVPN instance in MVPN information 76. MVPN information 76 may be stored in a series of tables, a database, a list, or various other data structures.

To maintain the ERMVPN instance, MVPN module 38 may maintain a list of multicast group membership messages received over XMPP sessions with devices 26, and listen to all changes to the ERMVPN instance (e.g., IGMP group membership information). For example, MVPN module 38 may store the multicast group membership messages, e.g., IGMP join messages, in ERMVPN information 78. These routes may be added to ERMVPN information 78 as MVPN source tree join routes (e.g., MVPN Type-7) as described in RFC 6514.

As previously described, devices 26 may each include a virtual agent (e.g., VAs 27 of FIG. 1) to snoop IGMP join advertised for the VMs. Each virtual agent of devices 26 may send the IGMP join messages over the XMPP sessions 64. SDN controller 23A may receive the IGMP join messages over the XMPP sessions 64 from devices 26 and stores this information within ERMVPN information 78.

MVPN module 38 of SDN controller 23A may use ERMVPN information 78 to generate multicast replication tree 75 (or update an existing multicast replication tree 75 based on changes to ERMVPN information 78). For example, SDN controller 23A may generate a multicast replication tree for each <S, G> combination under each tenant of data center 10A. The SDN controller 23A may generate multicast replication tree 75 using, for example, ERMVPN techniques 70F.

MVPN module 38 may select a multicast bridge node from among the virtual routers specified in multicast replication tree 75. For example, MVPN module 75 may select a virtual router from one of devices 26, e.g., VR 28A of device 26A, to function as a bridge between the MVPN network and the multicast replication network. That is, as the multicast bridge node, virtual router 28A of device 26A is configured to receive multicast traffic from PE device 11 of a remote VPN site outside of a network (e.g., outside of a data center) and to perform multicast replication within the network (e.g., within the data center). For an example in which the multicast bridge node VR 28A is selected as the right-most and bottom-most node of an edge replicated multicast tree, VR 28A is a child node that has a single parent node (e.g., one of VRs 28).

MVPN module 38 may instruct control node 56A to use the XMPP 70A to send configuration state information to VR agent 27A of device 26A to configure virtual router 28A to function as the multicast bridge node. For example, control node 56A may send configuration state information that causes virtual router 28A to receive multicast traffic from gateway 12 over a GRE/UDP tunnel and then send the multicast traffic according to the multicast replication tree to its local receivers and to its parent node, which in turn replicates the multicast traffic to its local receivers (e.g., VMs 44) and to other virtual routers indicated as its parent/ child nodes. More specifically, control node 56A may send an XMPP message sent to virtual router 28A of device 26A encoded with an Input Tunnel Attribute that comprises an IP address of a tunnel endpoint (e.g., gateway 12) as well as a tunnel type (e.g., MPLS over GRE/UDP).

MVPN module 38 may generate and send information identifying the multicast bridge node to PE device 11. For example, MVPN module 38 may generate an MVPN route, such as leaf AD route (e.g., MVPN Type-4 route), including a label of the multicast bridge node and an IP address of the multicast bridge node, and send the MVPN route to PE device 11. As one example implementation, MVPN module 38 may use a root node ingress label as the label in which the multicast source may tunnel the multicast traffic to the multicast bridge node. In other example implementations in which the service provider network uses EVPN, an EVPN module (not shown) may generate an SMET Route (EVPN Type 6 route) including the multicast bridge node label and network address of the multicast bridge node, and send the SMET route to PE device 11. For example, SDN controller 23 may include an EVPN module that implements the EVPN protocol to transport L2 communications (e.g., SMET routes) through an intermediate L3 network, e.g., service provider network 8, to PE device 11.

In some examples, MVPN module 38 may determine a change in ERMVPN information 78. For example, control node 56A may receive XMPP messages converted from IGMP leave messages for VMs requesting to leave a multicast group. In these examples, MVPN module 38 may listen to any changes to the ERMVPN instance, such as changes to ERMVPN information 78 as a result the IGMP leave messages, and modifies the edge replicated multicast tree. In the event a different multicast bridge node is selected from the modified edge replicated multicast tree, MVPN module 38 may notify, e.g., PE device 11, of these changes.

Figure 5:
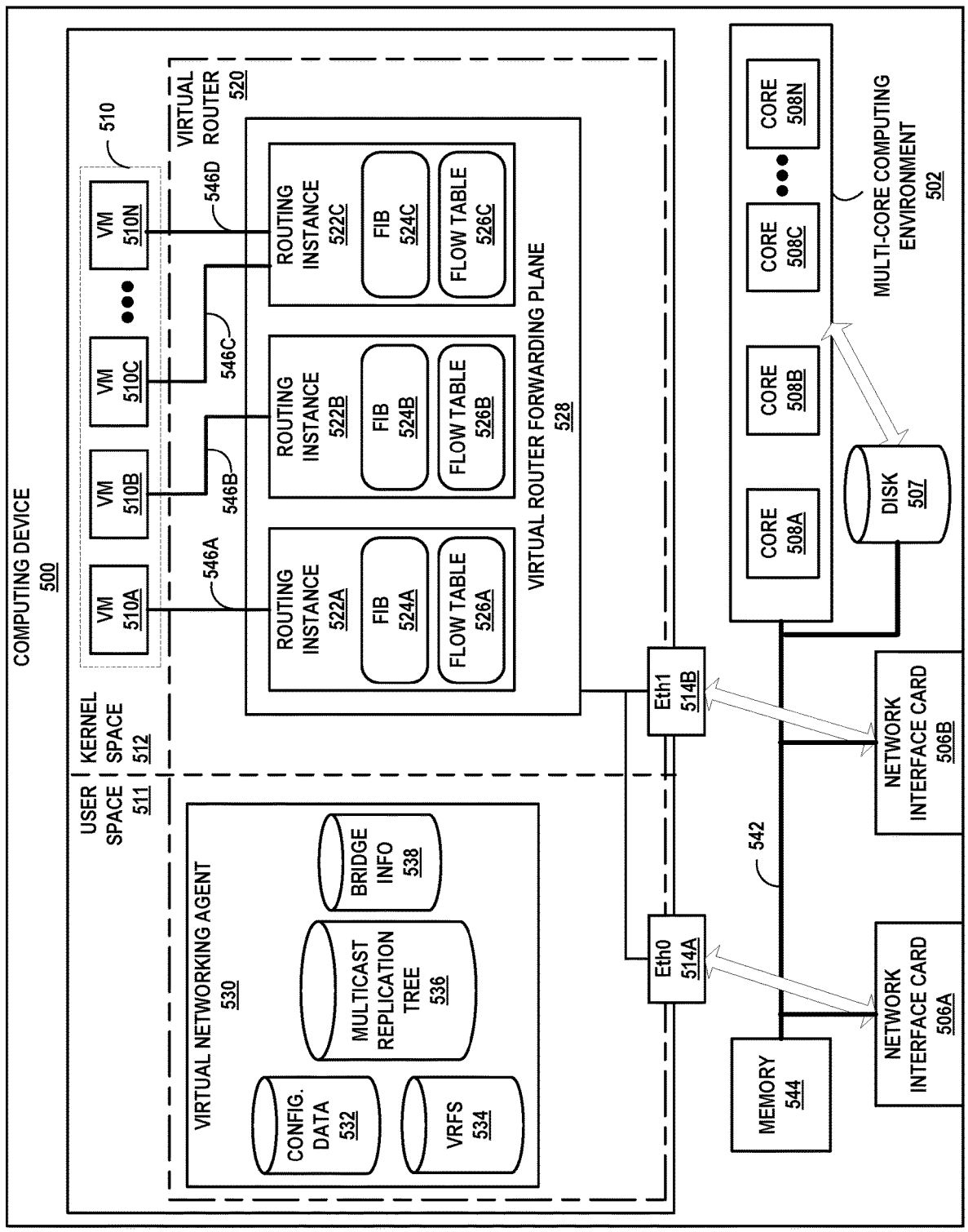
FIG. 5 is a block diagram illustrating an example of a device of FIGS. 1-4 in further detail, in accordance with techniques described in this disclosure.

FIG. 5 is a block diagram illustrating an example of a device of FIG. 1 in further detail, in accordance with techniques described in this disclosure. Computing device 500 may represent any of devices 26 of FIGS. 1-4.

In the example of FIG. 5, computing device 500 includes a system bus 542 coupling hardware components of a computing device 500 hardware environment. System bus 542 couples memory 544, network interface cards (NICs) 506A-506B (collectively, "NICs 506"), storage disk 507, and multi-core computing environment 502 having a plurality of processing cores 508A-508N (collectively, "processing cores 508"). Network interface cards 506 include interfaces configured to exchange packets using links of an underlying physical network. Multi-core computing environment 502 may include any number of processors and any number of hardware cores from, for example, four to thousands. Each of processing cores 508 each includes an independent execution unit to perform instructions that conform to an instruction set architecture for the core. Processing cores 508 may each be implemented as separate integrated circuits (ICs) or may be combined within one or more multi-core processors (or "many-core" processors) that are each implemented using a single IC (i.e., a chip multiprocessor).

Disk 507 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 508.

Main memory 544 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 544 provides a physical address space composed of addressable memory locations.

Memory 544 may in some examples present a non-uniform memory access (NUMA) architecture to multi-core computing environment 502. That is, cores 508 may not have equal memory access time to the various storage media that constitute memory 544. Cores 508 may be configured in some instances to use the portions of memory 544 that offer the lowest memory latency for the cores to reduce overall memory latency.

In some instances, a physical address space for a computer-readable storage medium may be shared among one or more cores 508 (i.e., a shared memory). For example, cores 508A, 508B may be connected via a memory bus (not shown) to one or more DRAM packages, modules, and/or chips (also not shown) that present a physical address space accessible by cores 508A, 508B. While this physical address space may offer the lowest memory access time to cores 508A, 508B of any of portions of memory 544, at least some of the remaining portions of memory 544 may be directly accessible to cores 508A, 508B. One or more of cores 508 may also include an L1/L2/L3 cache or a combination thereof. The respective caches for cores 508 offer the lowest-latency memory access of any of storage media for the cores 508.

Memory 544, NICs 506, storage disk 507, and multi-core computing environment 502 provide an operating environment for a software stack that executes a virtual router 520 and one or more virtual machines 510A-510N (collectively, "VMs 510"). Virtual machines 510 may represent example instances of any of virtual machines of FIGS. 1-3. VMs 510 are tenant VMs running customer applications such as Web servers, database servers, enterprise applications or hosting virtualized services used to create service chains, for example. In one example configuration, Linux® is the host operating system (OS).

The computing device 500 partitions the virtual and/or physical address space provided by main memory 544 and in the case of virtual memory by disk 507 into user space 511, allocated for running user processes, and kernel space 512, which is protected and generally inaccessible by user processes. An operating system kernel (not shown in FIG. 5) may execute in kernel space 512 and may include, for example, a Linux®, Berkeley Software Distribution (BSD), another Unix®-variant kernel, or a Windows® server operating system kernel, available from Microsoft® Corp. Computing device 500 may in some instances execute a hypervisor (such as hypervisor 46 of FIG. 2) to manage virtual machines 510. Example hypervisors include Kernel-based Virtual Machine (KVM) for the Linux® kernel, Xen, ESXi® available from VMware®, Windows® Hyper-V available from Microsoft®, and other open-source and proprietary hypervisors. In some examples, specialized hardware programmed with routing information such as FIBs 524 may execute the virtual router 520.

Eth0 514A and Eth1 514B represent devices according to a software device model and provide device driver software routines for handling packets for receipt/transmission by corresponding NICs 506. Packets received by NICs 506 from the underlying physical network fabric for the virtual networks may include an "outer packet" to allow the physical network fabric to tunnel the payload or "inner packet" to a physical network address for one of NICs 506. The outer packet may include not only the physical network address, but also a Multiprotocol Label Switching (MPLS) label or virtual network identifier such as VxLAN tag that identifies one of the virtual networks as well as the corresponding routing instance. The inner packet includes an inner header having a destination network address that conforms to the virtual network addressing space for the virtual network identified by the virtual network identifier. For example, virtual router forwarding plane 528 may receive by Eth1 from NIC 506 a packet having an outer header that includes an MPLS label associated with virtual router forwarding plane 528 with routing instance 522A. The packet may have an inner header having a destination network address that is a destination address of VM 510A that taps, via tap interface 546A, into routing instance 522A.

Virtual router 520 in this example includes a kernel space 512 module: virtual router forwarding plane 528, as well as a user space 511 module: virtual networking agent (VN agent) 530. Virtual router forwarding plane 528 executes the "forwarding plane" or packet forwarding functionality of the virtual router 520 and VN agent 530 executes the "control plane" functionality of the virtual router 520. VN agent 530 may represent an example instance of any of VN agents 27 of FIG. 2.

The virtual router forwarding plane 528 is responsible for encapsulating packets to be sent to the overlay network and de-encapsulating packets to be received from the overlay network. Virtual router forwarding plane 528 assigns packets to a routing instance such as routing instances 522A-522C (collectively, "routing instances 522") for corresponding virtual networks. Packets received from the overlay network are assigned to a routing instance. Virtual interfaces to local virtual machines, e.g., VMs 510, are bound to routing instances 522.

Each of routing instances 522 includes a corresponding one of forwarding information bases (FIBs) 524A-524C (collectively, "FIBs 524") and flow tables 526A-526C (collectively, "flow tables 526"). Although illustrated as separate data structures, flow tables 526 may in some instances be logical tables implemented as a single table or other associative data structure in which entries for respective flow tables 526 are identifiable by the virtual network identifier (e.g., a VRF identifier such as VxLAN tag or MPLS label). FIBs 524 include lookup tables that map destination addresses to destination next hops. Virtual router forwarding plane 528 performs a lookup of the destination address in FIBs 524 and forwards the packet to the correct destination. The destination addresses may include layer 3 network prefixes or layer 2 MAC addresses.

Flow tables 526 enable application of forwarding policies to flows. Each of flow tables 526 includes flow table entries that each match one or more flows that may traverse virtual router forwarding plane 528 and include a forwarding policy for application to matching flows.

In this example, VN agent 530 may be a user space 511 process executed by computing device 500. VN agent 530 includes configuration data 532, virtual routing and forwarding instances configurations 534 ("VRFs 534"), multicast replication tree 536, and multicast bridge node information 538 ("BRIDGE INFO 538"). VN agent 530 exchanges control information with one or more virtual network controllers (e.g., SDN controller 23 of FIGS. 1-3) using XMPP, for example. Control information may include, virtual network routes, low-level configuration state such as routing instances for installation to configuration data 532 and VRFs 534. VN agent 530 installs forwarding state into virtual router forwarding plane 528.

Assuming for example that virtual router 520 is selected to function as a multicast bridge node, VN agent 530 may receive from an SDN controller information identifying virtual router 520 as the multicast bridge node and store the information in bridge information 538. Bridge information 538 may include a label and/or IP address of virtual router 520. When multicast traffic is received from the physical network, computing device 500 may perform a lookup of bridge information 538 to determine whether the multicast traffic is encapsulated with multicast bridge node information that matches information stored in bridge information 538. In response to determining that the multicast bridge node information encapsulated with the multicast traffic matches information stored in bridge information 538, computing device 500 may perform multicast replication based on multicast replication tree 536.

VN agent 530 may receive multicast replication tree 536 that directs virtual router 520 how to replicate multicast traffic that is received from the physical network for local VMs, e.g., VMs 510. For example, VN agent 530 may receive a multicast replication tree that specifies VM 510A and VM 510C as receivers of multicast traffic. In this example, when multicast traffic is received and virtual router 520 determines that it is the multicast bridge node, virtual router 520 may replicate the multicast traffic to VM 510A and VM 510C using multicast replication tree 536.

Figure 6:
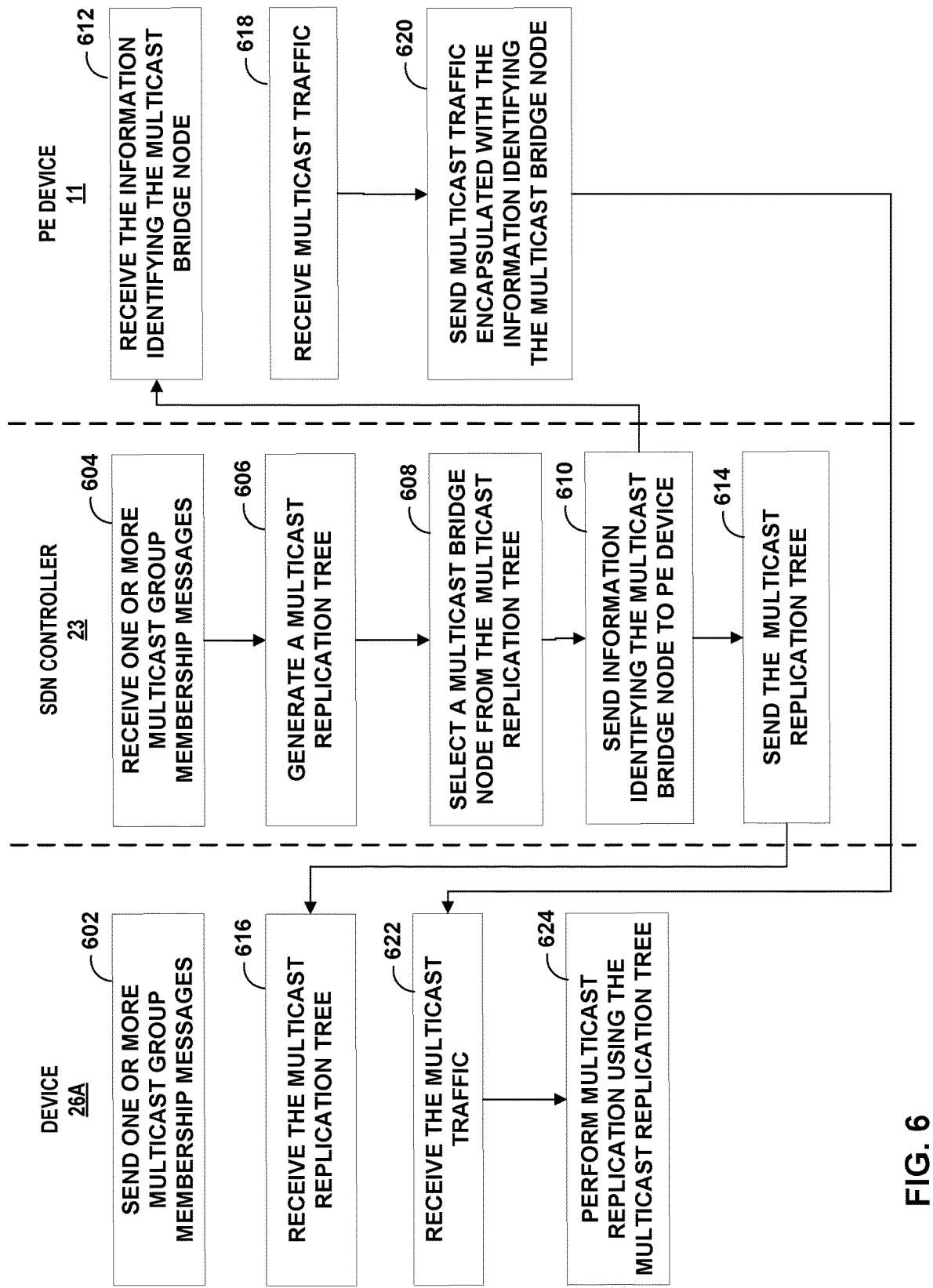
FIG. 6 is a flowchart illustrating an example operation of network devices, in accordance with the techniques described in this disclosure.

FIG. 6 is a flowchart illustrating an example operation in accordance with the techniques of the disclosure. For convenience, FIG. 6 is described with respect to network 2 of FIG. 1. In the example of FIG. 6, device 26A may send one or more multicast group membership messages identifying one or more virtualized entities of device 26A as receivers of a multicast group (602). For example, a virtual agent 27A of device 26A may snoop IGMP join or leave messages, and send the IGMP join or leave messages via XMPP to SDN controller 23.

SDN controller 23 receives the one or more multicast group membership messages that identify the one or more virtualized entities of device 26A as receivers of a multicast group (604). SDN controller 23 generates a multicast replication tree, e.g., edge replicated multicast tree, based on the multicast group membership information (606). For example, a compute node of SDN controller 23 may receive XMPP messages identifying one or more VMs of device 26A as receivers of a multicast group and may generate a multicast replication tree that specifies how virtual routers are to replicate the multicast traffic for the one or more VMs. The multicast replication tree may be an overlay distribution tree for the multicast group. In some examples, the multicast replication tree conforms to the edge replicated multicast tree described in the ERMVPN techniques.

SDN controller 23 may select a multicast bridge node from the multicast replication tree (608). For example, MVPN module 38 of SDN controller 23 may select a virtual router from a plurality of virtual routers specified in the multicast replication tree to function as a multicast bridge node. As one example, a right-most and bottom-most node of a multicast replication tree is selected as the multicast bridge node. In this example, the multicast bridge node has a single parent node and no child nodes. A virtual router functioning as a multicast bridge node may receive multicast traffic from an ingress multicast routing device, e.g., PE device 11, of the MVPN network and perform multicast replication on the received multicast traffic using the multicast replication trees.

SDN controller 23 sends information identifying the multicast bridge node to PE device 11 (610). For example, MVPN module 38 may generate and send information identifying the multicast bridge node, virtual router 28A. For example, MVPN module 38 may generate an MVPN route, such as leaf AD route (e.g., MVPN Type-4 route), including a label of the multicast bridge node and an IP address of the multicast bridge node, and send the MVPN route to PE device 11. As one example implementation, MVPN module 38 may use a root node ingress label as the label in which the multicast source may tunnel the multicast traffic to the multicast bridge node. In other example implementations in which the service provider network uses EVPN, an EVPN module may generate an SMET Route (EVPN Type 6 route) including the multicast bridge node label and network address of the multicast bridge node, and send the SMET route to PE device 11. PE device 11 receives the information identifying the multicast bridge node (612), which is used to steer multicast traffic toward the multicast bridge node.

Before device 26A receives multicast traffic from PE device 11, SDN controller 23 also sends the multicast replication tree to device 26A such that virtual router 28A of device 26A may perform edge replicated multicast using the multicast replication tree (614). Virtual router 28A of device 26A may receive the multicast replication tree (616) such that virtual router 28A may use the multicast replication tree to replicate multicast traffic to local VMs. For example, virtual router 28A may receive from a control node of SDN controller 23 configuration state information that causes virtual router 28A to receive multicast traffic from gateway 12 over a GRE/UDP tunnel and then flood the multicast traffic to nodes (e.g., VMs 44) specified in the multicast replication tree. More specifically, control nodes 56 may send an XMPP message sent to virtual router 28A encoded with an Input Tunnel Attribute that comprises an IP address of a tunnel endpoint (e.g., gateway 12) as well as a tunnel type (e.g., MPLS over GRE/UDP).

PE device 11 may receive multicast traffic from a multicast source (e.g., customer device 4) of the source VPN site (618) and send the multicast traffic encapsulated with the information identifying the multicast bridge node (620). For example, PE device 11 may send the multicast traffic encapsulated with the label of virtual router 28A to steer the multicast traffic to virtual router 28A that is functioning as the multicast bridge node. Virtual router 28A of device 26A may receive the multicast traffic encapsulated with the label of virtual router 28A (622) and replicates the multicast traffic using the multicast replication tree (624). For example, VR 28A receives the multicast traffic and sends the multicast traffic to its local receivers (e.g., VMs) and to its parent node identified in the edge replicated multicast tree, which in turn sends the multicast traffic to its local receivers and to its parent/child nodes indicated in the edge replicated multicast tree.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
   receiving, by a software defined networking (SDN) controller of a data center including one or more devices each having one or more virtualized entities configured thereon, one or more multicast group membership messages that identify the one or more virtualized entities as receivers of a multicast group, wherein the data center is a receiver virtual private network (VPN) site to receive one or more multicast messages for the multicast group;
   generating, by the SDN controller, a multicast replication tree that is used by the one or more devices to replicate multicast traffic within the receiver VPN site, wherein the multicast replication tree is an overlay distribution tree for the multicast group, the multicast replication tree specifying a plurality of virtual routers as nodes of the multicast replication tree;
   selecting, by the SDN controller, a virtual router from the plurality of virtual routers specified in the multicast replication tree to operate as a multicast bridge node to bridge a source VPN site external to the data center with the receiver VPN site of the data center, wherein the multicast bridge node is configured to receive the multicast traffic from a remote provider edge (PE) device for the source VPN site for the multicast group and to replicate the multicast traffic within the receiver VPN site based on the multicast replication tree; and
   sending, by the SDN controller and to the remote PE device, information identifying the multicast bridge node that is used to steer the multicast traffic from the source VPN site to the multicast bridge node of the receiver VPN site.

2. The method of claim 1,
wherein the information identifying the multicast bridge node comprises a label of the virtual router and an Internet Protocol (IP) address of the virtual router.

3. The method of claim 2, wherein the multicast traffic received from the remote PE device is encapsulated with the label of the virtual router.

4. The method of claim 1,
wherein the source VPN site and the receiver VPN site are configured to provide a multicast virtual private network (MVPN) instance, and
wherein sending the information identifying the multicast bridge node comprises sending a leaf auto-discovery route including the information identifying the multicast bridge node.

5. The method of claim 1,
wherein the source VPN site and the receiver VPN site are configured to provide an Ethernet Virtual Private Network (EVPN) instance, and
wherein sending the information identifying the multicast bridge node comprises sending a Selective Multicast Ethernet Tag Route (SMET) including the information identifying the multicast bridge node.

6. The method of claim 1, wherein the multicast bridge node comprises a first multicast bridge node, wherein the plurality of virtual routers comprises a first plurality of virtual routers, wherein the multicast replication tree comprises a first multicast replication tree, and wherein the multicast traffic comprises a first multicast traffic, the method further comprising:
determining, by the SDN controller and based on one or more subsequent multicast group membership messages, that the multicast group has changed;
generating, by the SDN controller, a second multicast replication tree for the changed multicast group;
selecting, by the SDN controller, a second virtual router from a second plurality of virtual routers specified in the second multicast replication tree to operate as a second multicast bridge node; and
sending, by the SDN controller and to the remote PE device, information identifying the second multicast bridge node, wherein the information causes the remote PE device such that the remote PE device uses the information identifying the second multicast bridge node to steer second multicast traffic received from the multicast source of the source VPN site to the second multicast bridge node of the receiver VPN site.

7. The method of claim 1,
wherein the receiver VPN site implements an edge replicated multicast for virtual private networking (ER-MVPN) technique to replicate multicast traffic within the receiver VPN site, and
wherein the remote PE device steers the multicast traffic between the source VPN site and the receiver VPN site using a multicast protocol.

8. The method of claim 1,
wherein the source VPN site and the receiver VPN site are each layer 2 VPN sites, and
wherein the source VPN site and receiver VPN site communicate via a layer 3 VPN.

9. A software defined networking (SDN) controller of a data center of a receiver virtual private network (VPN) site including one or more devices each having one or more virtualized entities configured thereon, the SDN controller comprising:
one or more processors, wherein the one or more processors are configured to:
receive one or more multicast group membership messages that identify the one or more virtualized entities as receivers of a multicast group;
generate a multicast replication tree that is used by the one or more devices to replicate multicast traffic within the receiver VPN site, wherein the multicast replication tree is an overlay distribution tree for the multicast group, the multicast replication tree specifying a plurality of virtual routers as nodes of the multicast replication tree;
select a virtual router from a plurality of virtual routers specified in the multicast replication tree to operate as a multicast bridge node to bridge a source VPN site external to the data center with the receiver VPN site of the data center, wherein the multicast bridge node is configured to receive the multicast traffic from a remote provider edge (PE) device for the source VPN site for the multicast group and to replicate the multicast traffic based on the multicast replication tree; and
send, to the remote PE device, information identifying the multicast bridge node that is used to steer the multicast traffic from the source VPN site to the multicast bridge node of the receiver VPN site.

10. The SDN controller of claim 9,
wherein the information identifying the multicast bridge node comprises a label of the virtual router and an Internet Protocol (IP) address of the virtual router.

11. The SDN controller of claim 10, wherein the multicast traffic received from the remote PE device is encapsulated with the label of the virtual router.

12. The SDN controller of claim 9,
wherein the source VPN site and the receiver VPN site are configured to provide a multicast virtual private network (MPVN) instance, and
wherein, to send the information identifying the multicast bridge node, the one or more processors are configured to send a leaf auto-discovery route including the information identifying the multicast bridge node.

13. The SDN controller of claim 9,
wherein the source VPN site and the receiver VPN site are configured to provide an Ethernet Virtual Private Network (EVPN) instance, and
wherein, to send the information identifying the multicast bridge node, the one or more processors are configured to send a Selective Multicast Ethernet Tag Route (SMET) information identifying the multicast bridge node.

14. The SDN controller of claim 9, wherein the multicast bridge node comprises a first multicast bridge node, wherein the plurality of virtual routers comprises a first plurality of virtual routers, wherein the multicast replication tree comprises a first multicast replication tree, and wherein the multicast traffic comprises a first multicast traffic, the one or more processors are further configured to:
determine, based on one or more subsequent multicast group membership messages, that the multicast group has changed;
generate a second multicast replication tree for the changed multicast group;

select a second virtual router from a second plurality of virtual routers specified in the second multicast replication tree to operate as a second multicast bridge node; and send, by the SDN controller and to the remote PE device, information identifying the second multicast bridge node, wherein the information causes the remote PE device such that the remote PE device uses the information identifying the second multicast bridge node that is used to steer second multicast traffic from the source VPN site to the second multicast bridge node of the receiver VPN site.

15. The SDN controller of claim 9,
wherein the receiver VPN site implements an edge replicated multicast for virtual private networking (ER-MVPN) technique to replicate multicast traffic within the receiver VPN site, and
wherein the remote PE device steers the multicast traffic between the source VPN site and the receiver VPN site using a multicast protocol.

16. The SDN controller of claim 15,
wherein the source VPN site and the receiver VPN site are each layer 2 VPN sites, and
wherein source VPN site and the receiver VPN site communicate via a layer 3 VPN.

17. A device of a data center of a receiver virtual private network (VPN) site, the device comprising:
a virtual router;
one or more virtualized entities coupled to the virtual router;
one or more processors, wherein the one or more processors are configured to:
sending, to a software defined networking (SDN) controller, one or more multicast group membership messages that identify the one or more virtualized entities of the device as receivers of a multicast group; and
receiving, from the SDN controller, configuration state information that causes the virtual router to, in response to receiving multicast traffic from a remote provider edge (PE) device for a source VPN site external to the data center, replicate the multicast traffic based on a multicast replication tree, wherein the multicast traffic includes information identifying the virtual router as a multicast bridge node to bridge the source VPN site with a receiver VPN site of the data center.

18. The device of claim 17, wherein the configuration state information comprises an IP address of a source tunnel endpoint within the data center that sends the multicast traffic to the virtual router and a tunnel type.

19. The device of claim 17, wherein the one or more processors are further configured to:
receive, from the remote PE device, multicast traffic including the information identifying a multicast bridge node; and
replicate the multicast traffic to the one or more virtualized entities that are receivers of the multicast group.

20. The device of claim 19, wherein, to replicate the multicast traffic, the one or more processors are configured to determine whether the multicast traffic is encapsulated with a label of the virtual router.

* * * * *